No. 749,871. PATENTED JAN. 19, 1904.
P. MAGINNIS.
EXTENSIBLE TROUGH OR FLUME.
APPLICATION FILED JUNE 9, 1903.
NO MODEL.

Patrick Maginnis, Inventor,

Witnesses
Howard W. Orr.
H. J. Riley.

By E. G. Siggers.

Attorney

No. 749,871. Patented January 19, 1904.

UNITED STATES PATENT OFFICE.

PATRICK MAGINNIS, OF KIMBALL, NEBRASKA.

EXTENSIBLE TROUGH OR FLUME.

SPECIFICATION forming part of Letters Patent No. 749,871, dated January 19, 1904.

Application filed June 9, 1903. Serial No. 160,744. (No model.)

*To all whom it may concern:*

Be it known that I, PATRICK MAGINNIS, a citizen of the United States, residing at Kimball, in the county of Kimball and State of Nebraska, have invented a new and useful Extensible Trough or Flume, of which the following is a specification.

The invention relates to extensible water-troughs and irrigation-flumes and analogous conduits.

The object of the present invention is to improve the construction of extensible troughs and flumes, more especially the means for connecting the sections of the same, and to provide a simple, inexpensive, and efficient joint or splice adapted to present a smooth inner surface at the ends of the sections, to avoid retarding the passage of the water, and to reduce the friction to a minimum, and capable of enabling trough and flume sections to be rapidly connected without the use of rivets, solder, or analogous means, which permanently fasten the sections together and which require much time and labor in order to produce anything like a smooth water-tight joint.

It is also the object of the invention to provide a splice or joint of this character adapted to enable trough-sections to be united either with or without packing-strips and capable of enabling cement, paint, and lead to be conveniently utilized in smoothing a joint where the sheet-steel or other metal is rough through galvanizing the same.

Furthermore, the invention has for its object to provide a joint or splice adapted to suspend a trough or flume from side stringers without necessitating the attachment of the edges of the sections to the said stringers.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

Figure 1:
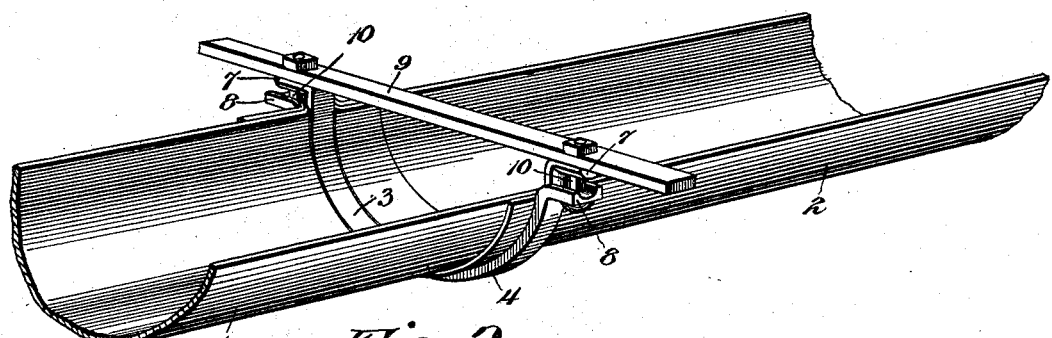
Figure 2:
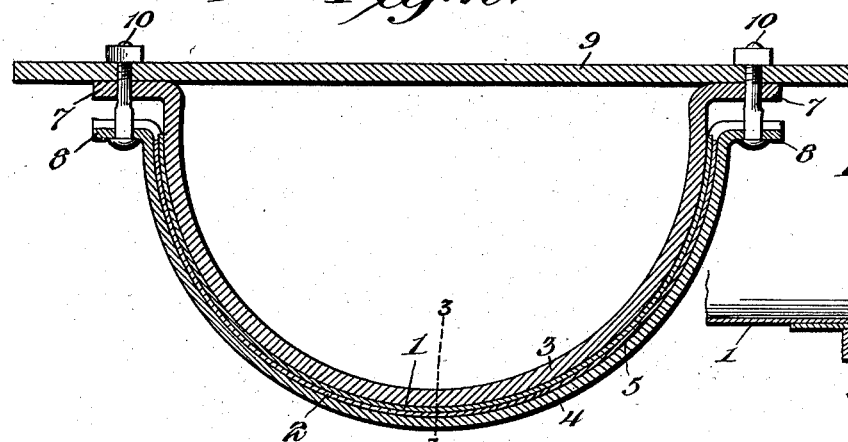
Figure 3:
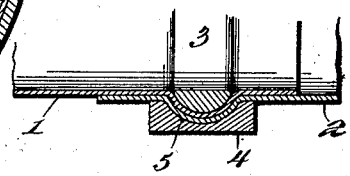
Figure 4:
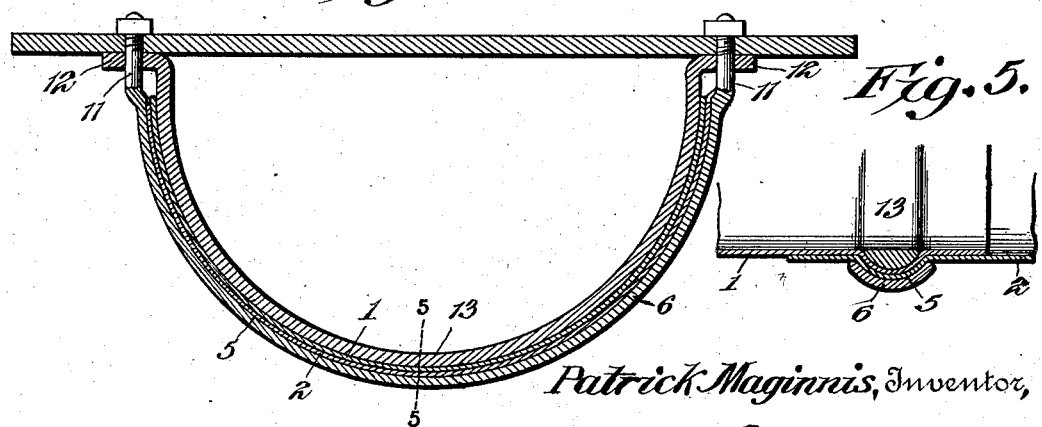
Figure 5:
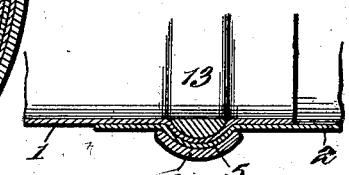

In the drawings, Figure 1 is a perspective view of a portion of a trough or flume provided with a splice or joint constructed in accordance with this invention. Fig. 2 is a vertical sectional view taken transversely of the trough or flume through one of the joints or splices. Fig. 3 is a detail sectional view on the line 3 3 of Fig. 2. Fig. 4 is a vertical sectional view similar to Fig. 2, illustrating a modification of the invention. Fig. 5 is a detail sectional view on the line 5 5 of Fig. 4.

Like numerals of reference designate corresponding parts in all the figures of the drawings.

1 and 2 designate approximately semicylindrical sections of sheet metal, preferably sheet-steel, having their adjacent ends overlapped, as clearly illustrated in Figs. 1 and 3 of the drawings, and forming a continuous water-conduit and adapted to be employed in the construction of irrigation-flumes, water-troughs, and analogous devices. The semicylindrical sections, which may be constructed of any desired size, are preferably galvanized to prevent rust, and the overlapped ends are firmly clamped together by interior and exterior clamping members 3 and 4. The exterior clamping member, which is curved to conform to the configuration of the sections, is provided at its inner face with a groove or channel 5, preferably semicircular in cross-section, as clearly illustrated in Fig. 3 of the drawings; but the exterior of the member 4 may be provided with straight side and bottom edges cross-sectionally, as shown in Fig. 3, or an exterior member 6, such as illustrated in Fig. 5, may be employed. The member 6 is curved in cross-section and presents an inner groove or channel and an exterior convex face. The exterior member may be constructed of any desired size and may have any exterior configuration to secure the desired strength to adapt the flume, water-trough, or the like to the use to which it is to be put. The inner clamping member is approximately semicircular in cross-section and is curved longitudinally to conform to the configuration of the sections of the trough or flume, and it presents cross-sectionally a smooth straight upper edge and an inner or lower curved edge. The inner curved or convex face of the inner clamping member is adapted to curve the overlapped portions of the ends of the sections outward into the groove or channel of the exterior member, and the groove or depression in the overlapped ends thus formed by the inner member receives the latter, as shown in Fig. 3, and the upper face of the inner member forms a continuation of the adjacent surfaces of the section 1, and a continuous smooth surface is thus provided. This is of great advantage in irrigation-flumes, as the flow of the water through the flume is not retarded and the friction is reduced to a minimum. The water flows from the section 1 into the section 2, and as the former overlaps the latter the edge of the sheet metal does not affect or retard in the slightest degree the flow of the water.

The interior and exterior clamping members have their ends extended outward horizontally to form arms or extensions 7 and 8, projecting laterally from the sections and adjustably connected with a transverse supporting-bar 9 by means of bolts 10; but the terminals of the exterior member may be extended vertically and formed into integral bolts or screws 11, as illustrated in Fig. 4 of the drawings. The arms or extensions 7 and 8 are perforated to receive the bolts 10, which also pass through perforations of the supporting-bar 9, and by tightening the nuts of the bolts 10 the overlapped ends of the sections 1 and 2 may be clamped together with the desired force and a water-tight joint may be quickly effected. The supporting-bar may be constructed of any suitable material, either wood or metal, and it extends outward beyond the terminals of the inner and outer clamping members and is designed to be secured to the side stringers (not shown) of a flume or to the supporting-framework of a water-trough. The upper edges or side edges of the sections terminate short of the upper arms 7 of the inner clamping member, and the side edges of the said sections are not compressed by the clamping action of the members and do not interfere with the same. If desired, a packing-strip may be interposed between the overlapped portions of the sections; but this is unnecessary and may be employed or omitted, as desired, and the rough edges formed by galvanizing the sheet metal may be filled in with cement, paint, lead, or the like to present a smooth surface.

In Figs. 4 and 5 of the drawings is illustrated a slight modification of the invention, the terminals of the exterior clamping member being extended through the arms 12 of the inner clamping member 13. Also the outer clamping member is provided with a curved outer face, as before explained. Also, if desired, the side edges of the sections may be stiffened and reinforced by angle-bars when the structure is to be subjected to a heavy weight or strain and where great strength is necessary or desirable.

When the sections are used in a water-trough, the ends of the latter are closed in any suitable manner.

What I claim is—

1. In a device of the class described, the combination with two sections having overlapped ends, of inner and outer clamping members conforming to the configuration of the sections, the exteriorly-arranged member being provided in its inner face with a groove or channel, and the interiorly-arranged member conforming to the configuration of the groove or channel and adapted to depress the overlapped sections into the same, said interiorly-arranged member being received within the depressed portions of the sections and having its upper or outer face flush with the latter to provide a smooth interior surface for the sections, and means for adjustably connecting the members, substantially as described.

2. In a device of the class described, the combination with two sections having overlapped ends, of inner and outer clamping members conforming to the configuration of the sections, the outer member being provided with a channel or groove, and the inner member being adapted to depress the overlapped ends of the sections into the groove or channel and fitting in the depressed portions and having its upper or outer face flush with the adjacent faces of the sections to provide a smooth inner surface for the same, substantially as described.

3. In a device of the class described, the combination with two sections having overlapped ends, of inner and outer clamping members, the outer clamping member being provided with a groove or channel, and the inner clamping member being adapted to depress the overlapped ends into the groove or channel and being seated in such depressed portions with its outer face substantially flush with the adjacent faces of the sections to provide a smooth inner surface, substantially as described.

4. In a device of the class described, the combination with two sections having overlapped ends, of inner and outer clamping members having their terminals extended outwardly and forming arms, the inner member being seated in a depression of the sections, and the outer member being provided with a groove or channel to receive the depressed portions of the sections, and adjusting devices connecting the arms, substantially as described.

5. In a device of the class described, the combination with two sections having overlapped ends provided with a depression, of inner and outer members, the outer member receiving the depressed portions of the sections and the inner member fitting in the said depression with its outer face substantially flush with the inner surfaces of the sections, substantially as described.

6. In a device of the class described, the combination with two sections having overlapped ends, of inner and outer clamping members, the outer member being provided in its inner face with a channel or groove, and the inner member being adapted to depress the overlapped ends into the groove or channel and having its outer face substantially flush with the inner faces of the sections to provide a smooth continuous inner surface, and a supporting-bar adjustably connected with the members and extended beyond the sections, substantially as and for the purpose described.

7. In a device of the class described, the combination with two sections having overlapped ends, of inner and outer clamping members, the outer member being provided with a groove or channel, and the inner member being adapted to depress the sections into the said groove or channel, a supporting-bar extended beyond the sections, and adjustable fastening devices connecting the members and securing the same to the supporting-bar, substantially as described.

In testimony that I claim the foregoing as my own I have hereto affixed my signature in the presence of two witnesses.

PATRICK MAGINNIS.

Witnesses:
 LOUIS W. BICKEL,
 FRANCIS H. DE CASTRO.